United States Patent
Pokharna et al.

(10) Patent No.: US 7,048,038 B2
(45) Date of Patent: *May 23, 2006

(54) INCREASED THERMAL CAPABILITY OF PORTABLE ELECTRONIC DEVICE IN STATIONARY OR DOCKED MODE

(75) Inventors: Himanshu Pokharna, San Jose, CA (US); Eric Distefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/751,649

(22) Filed: Jan. 6, 2004

(65) Prior Publication Data

US 2004/0201959 A1  Oct. 14, 2004

Related U.S. Application Data

(63) Continuation of application No. 09/895,465, filed on Jul. 2, 2001, now Pat. No. 6,674,640.

(51) Int. Cl.
*F28D 15/00* (2006.01)

(52) U.S. Cl. .................. 165/104.21; 165/104.33; 165/185; 361/687; 361/700; 174/15.2; 257/715

(58) Field of Classification Search .......... 165/104.33, 165/104.21, 80.4, 185; 361/699, 700; 174/16.3, 174/15.2; 257/706, 714, 716
See application file for complete search history.

(56) References Cited

U.S. PATENT DOCUMENTS

| | | | | |
|---|---|---|---|---|
| 5,974,556 | A  * | 10/1999 | Jackson et al. | 713/322 |
| 6,118,654 | A  * | 9/2000 | Bhatia | 361/687 |
| 6,172,871 | B1 * | 1/2001 | Holung et al. | 361/687 |
| 6,181,553 | B1 * | 1/2001 | Cipolla et al. | 361/687 |
| 6,239,970 | B1 * | 5/2001 | Nakai et al. | 361/695 |
| 6,276,448 | B1 * | 8/2001 | Maruno | 165/185 |
| 6,415,612 | B1 * | 7/2002 | Pokharna et al. | 62/3.2 |
| 6,437,982 | B1 * | 8/2002 | Cardenas | 361/700 |
| 6,560,104 | B1 * | 5/2003 | DeHoff et al. | 361/687 |
| 6,563,703 | B1 * | 5/2003 | Xie | 361/687 |
| 6,687,123 | B1 * | 2/2004 | Kitahara | 361/695 |

* cited by examiner

*Primary Examiner*—Terrell Mckinnon
(74) *Attorney, Agent, or Firm*—Kenyon & Kenyon LLP

(57) ABSTRACT

A technique for increasing the thermal capability of a portable electronic device includes transferring dissipated heat from a heat source disposed within the portable electronic device to at least one heat exchanger via at least one respective thermal transfer device. This may be in addition to another heat exchanger connected to the heat source via another thermal transfer device. At least one external fan is disposed adjacent to the at least one heat exchanger and dissipated heat transferred from the heat source to the at least one heat exchanger is removed via a flow of air generated by the at least one external fan. This may be in addition to an internal fan disposed adjacent the another heat exchanger to dissipate heat transferred from the heat source to the anther heat exchanger via flow of air generated by the internal fan. The at least one thermal transfer device may be a heat pipe. The portable electronic device may be a notebook computer and the heat source disposed therein may be a processor.

18 Claims, 6 Drawing Sheets

INCREASED THERMAL CAPABILITY OF PORTABLE ELECTRONIC DEVICE IN STATIONARY OR DOCKED MODE

RELATED APPLICATIONS

This application is a Continuation of U.S. Ser. No. 09/895,465 filed on Jul. 2, 2001, now U.S. Pat. No. 6,674,640.

FIELD

The present invention relates to increasing the thermal capability of a portable electronic device, such as a notebook computer, in the stationary or docked mode and more particularly, the present invention relates to providing one or more additional heat transfer/exchanger units in the notebook computer to increase thermal cooling with one or more external fans.

BACKGROUND

As processor speeds increase, processor power dissipation also increases. With increasing processor power dissipation levels, the limit on the cooling capability within a notebook computer has almost been reached. When the internal cooling capability reaches its limit, the burden of cooling will have to shift to external cooling via a thermal port or docking station to enable the notebook computer to perform at peak performance in the stationary or docked mode with cooling assistance from the thermal port or docking station and at a reduced power level and reduced performance within the limits on the cooling capability of the notebook computer when standing alone.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
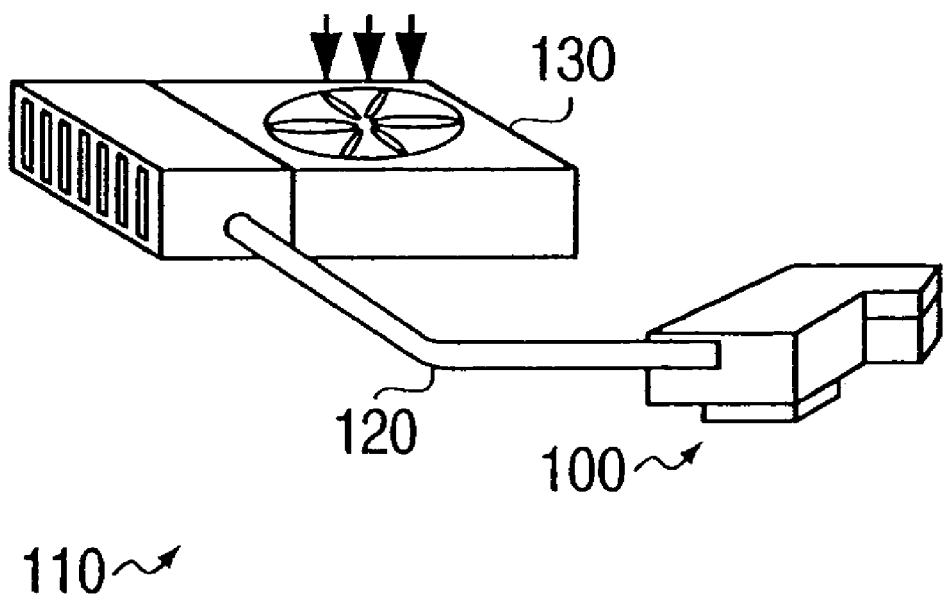
FIG. 1 illustrates a disadvantageous example of the thermal arrangement of a processor disposed within a notebook computer.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Where specific details have been set forth in order to describe example embodiments of the invention, it should be apparent to one skilled in the art that the invention can be practiced without, or with variations of, these specific details.

Although example embodiments of the present invention will be described using a notebook computer and a processor disposed therein, the present invention is not limited thereto but rather the present invention is applicable to any portable electronic device having a heat source contained therein.

As illustrated in FIG. 1, normally a processor 100 disposed within a notebook computer 110 is thermally coupled to a heat exchanger/internal fan 130 by a heat transfer device 120 which is normally a heat pipe. During normal operation, the heat pipe 120 transfers the heat dissipated by the processor 100 to the heat exchanger/internal fan 130. Since it is desirable to reduce the size and weight of the notebook computer 110 to a minimum, the size of the heat exchanger/internal fan 130 is rather limited, thereby limiting the maximum allowable heat dissipation of the processor 100.

Figure 2:
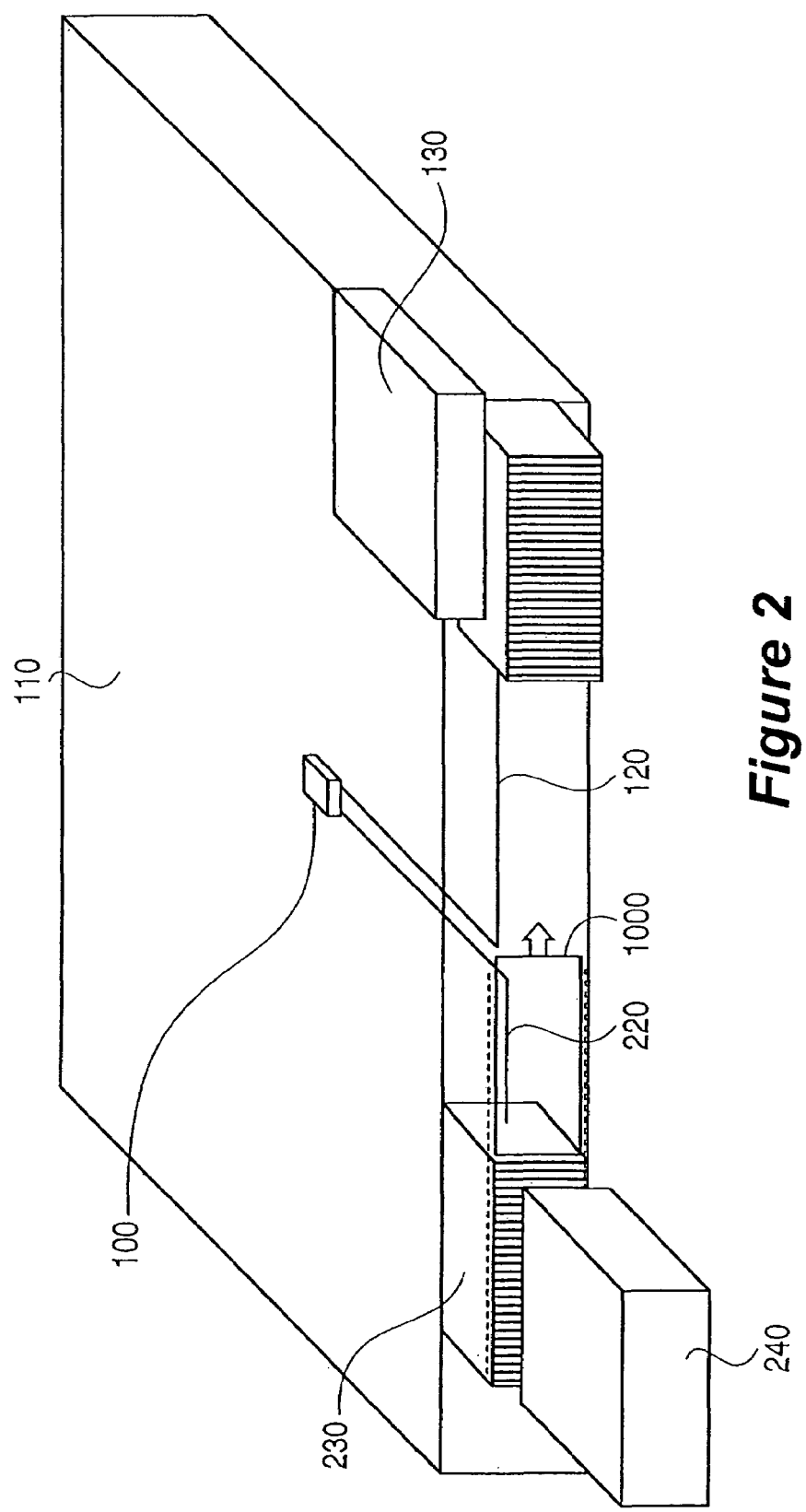
FIG. 2 illustrates an example of the thermal arrangement of a processor disposed within a notebook computer in accordance with an illustrative example of the present invention.

As illustrated in FIG. 2, in one illustrative example in accordance with the present invention, a second heat transfer device 220, which may also be a heat pipe, is thermally coupled between the processor 100 and a second heat exchanger 230. The second heat exchanger 230 is then thermally coupled to an external fan 240. Since this external fan 240 is only used during the stationary or docked operation mode of the notebook computer 110, it is not limited in size or weight as is the internal fan which is part of the heat exchanger/internal fan 130 disposed within the notebook computer 110. Accordingly, this external fan 240, in concert with the second heat exchanger 230 and second heat transfer device 220 can be used to remove a considerable amount of heat from the processor 100, to allow the processor 100 to operate at maximum capability.

Figure 3:
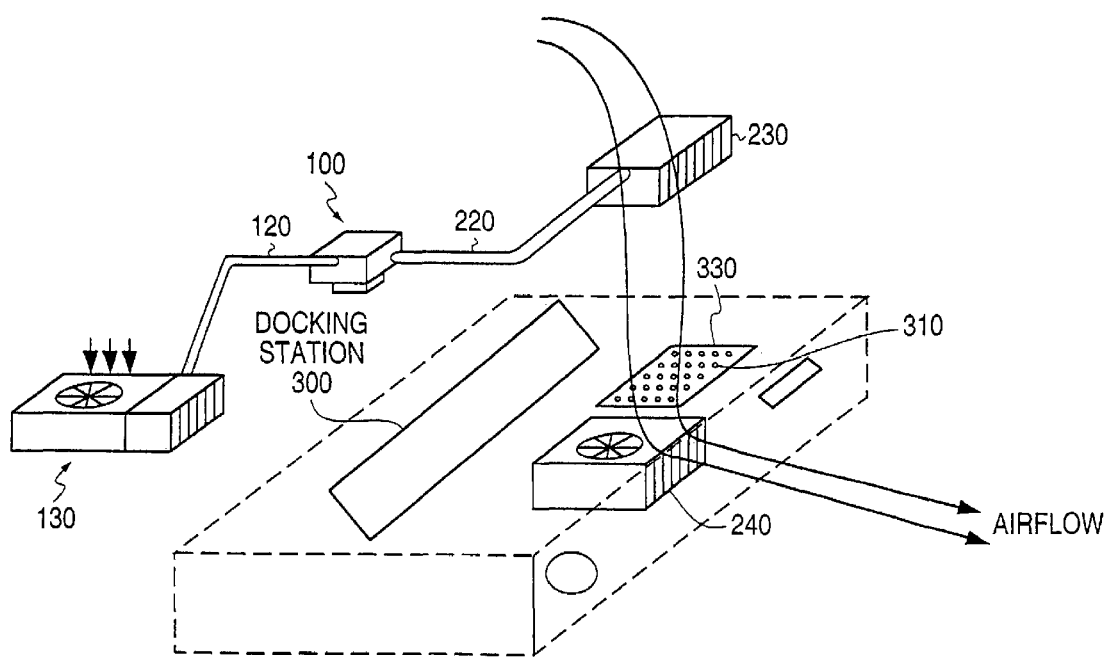
FIG. 3 illustrates another example of the thermal arrangement of a processor disposed within a notebook computer in accordance with an illustrative example of the present invention.

In more detail, in accordance with another illustrative example, as illustrated in FIG. 3, the second heat exchanger 230 mates with the external fan 240 via a dove-tailed O-ring 310, for example, disposed within a docking station 300. Air holes are provided within the notebook computer 110 to allow air to flow into the notebook computer 110 and then flow through the second heat exchanger 230 and then out an air opening 330 in the docking station 300, the air being moved by the external fan 240 within the docking station 300. Alternatively, the airflow can be in the opposite direction, that is, the flow n be into the air opening 310 and out the airholes. The heat exchanger/internal fan 130, disposed within the notebook computer 110, may also be operated to provide additional cooling.

The second heat exchanger 230 may be disposed close to the bottom skin of the notebook computer 110 for easy mating with the dove-tailed O-ring 310 and can be hidden away by,a retractable cover when the notebook computer 110 is not in the docked mode, the retractable cover being similar to those used with docking connectors in present notebook computers.

The air inlets or outlets for the notebook computer 110 may be disposed on the front side of the notebook computer 110 so that no connector space is compromised. Alternatively, the air inlets or outlets for the notebook computer 110 may be disposed on the bottom of the notebook computer 110 and hidden away by another retractable cover so as to provide a large air intake opening or exhaust only during the docking mode of the notebook computer 110.

It is of course understood that the dove-tailed O-ring 310 is but one example of a seal which may be used to prevent air leakage between the second heat exchanger 230 and the external fan 240. Furthermore, it may be possible to eliminate the use of a seal completely in some arrangements.

During the un-docked mode of operation, the heat pipe 120 transfers the heat dissipated by the processor 100 to the heat exchanger/internal fan 130. During this time, the temperature of the second heat pipe 220 and the second heat exchanger 230 rise up to the temperature of the heat pipe 120 but there is no heat being carried away from the second heat exchanger 230.

However, in the docked mode of operation, the retractable cover hiding the second heat exchanger 230 is retracted, allowing the second heat exchanger 230 to mate with the O-ring 310 disposed on the docking station 300. The mating is almost airtight and the O-ring 310 can be designed so that it compresses easily just by the weight of the notebook computer 110, thereby eliminating a need for any extra force.

Figure 4:
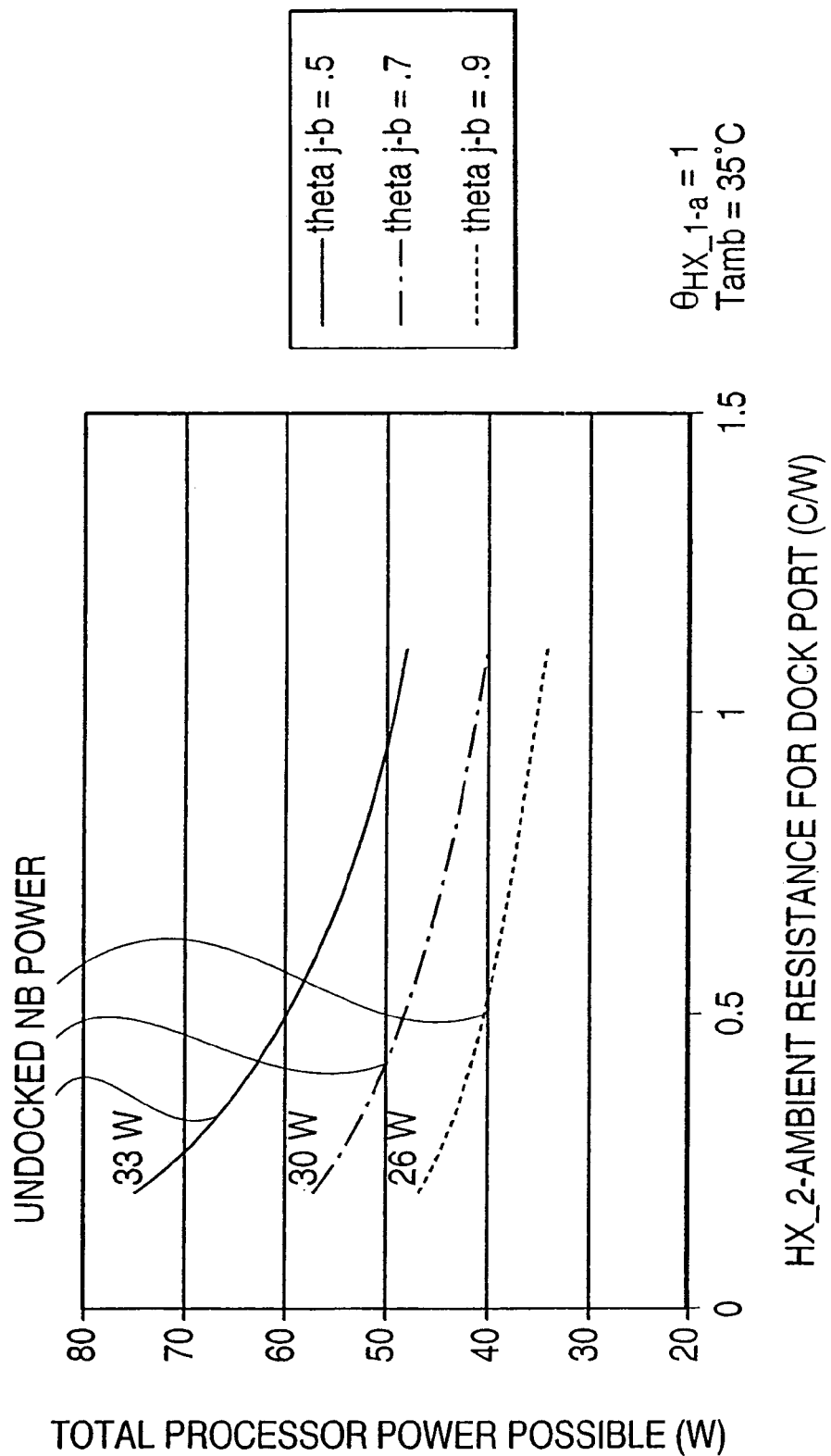
FIG. 4 illustrates a graph showing the relationship between processor power dissipation and ambient resistance for a docking station.

FIG. 4 is a graph illustrating the possible processor power is possible as a function of the second heat exchanger to air thermal resistance with the configuration illustrated in FIG. 3. It is clear from this graph that it is possible to get a significant increase in cooling even at a high heat exchanger to air thermal resistance.

Referring back to FIG. 2, the external fan 240 does not have to be disposed within a docking station but rather may be a "clip-on" or "snap-on" fan which may be clipped or snapped onto the notebook computer 110 when the notebook computer 110 is in a stationary mode in the same fashion as an AC adapter may be clipped or snapped onto the notebook computer 110 when it is used in its stationary mode.

Figure 5:
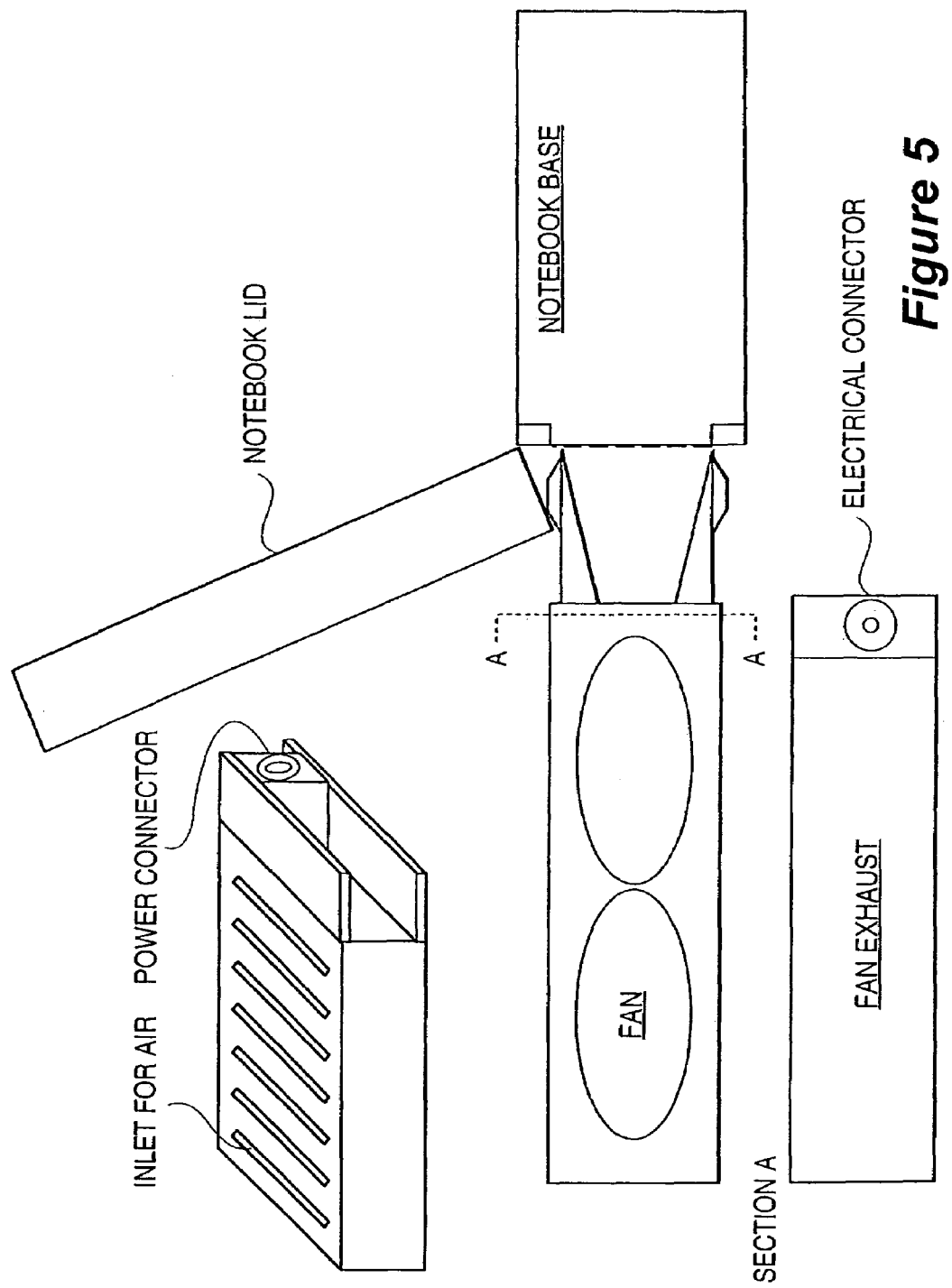
FIG. 5 illustrates an example of a "clip-on" external fan attached to a notebook computer.
Figure 6:
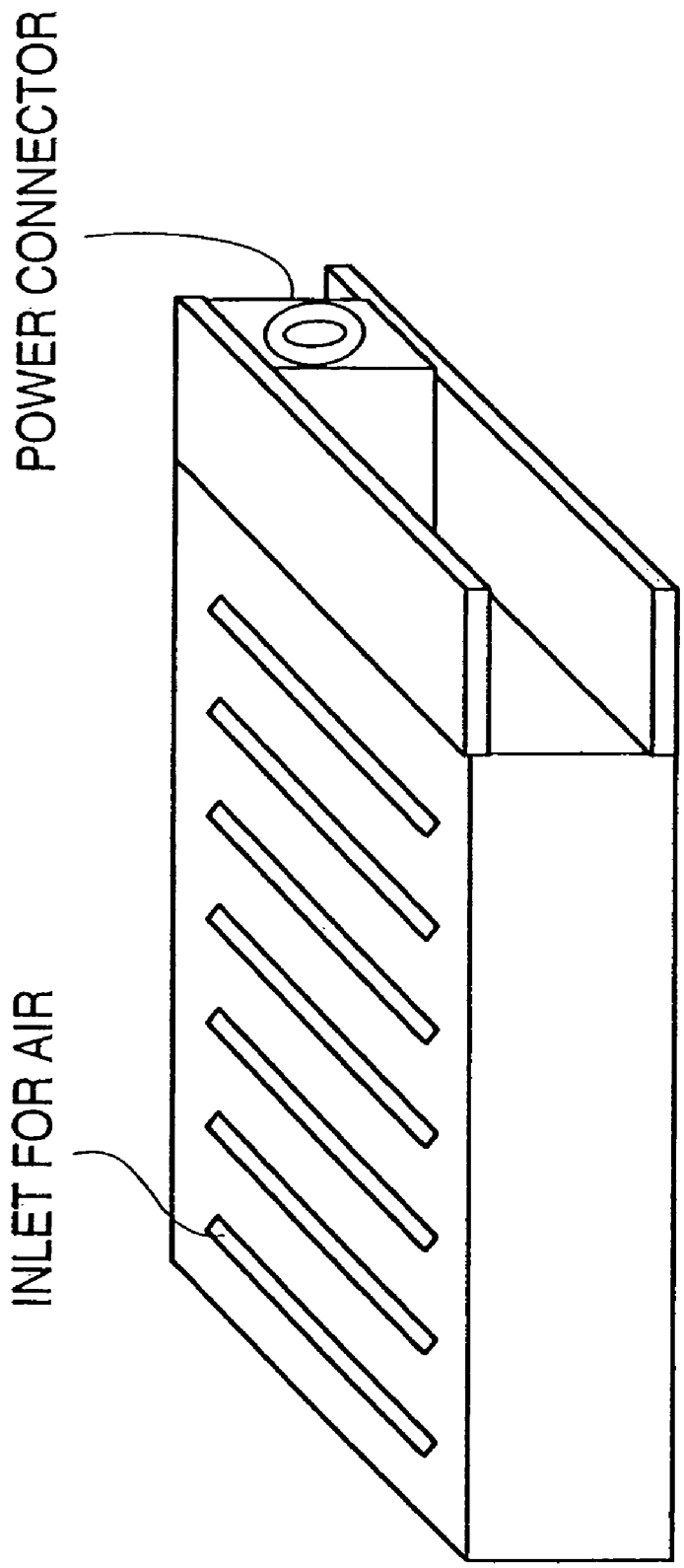
FIG. 6 illustrates an example of a "clip-on" external fan.

Furthermore, the power needed to drive this fan may be provided by the notebook computer 110 via an electrical connector that engages a mating connector on the fan when clipped into the notebook computer 110. This allows the processor 100 disposed within the notebook computer 110 to operate at its' maximum capability when the notebook computer 110 is in its stationary mode of operation. FIGS. 5 and 6 illustrate such an arrangement.

In conclusion, the use of the present invention enables a significant gain in cooling potential as compared with earlier arrangements. The present invention allows a larger more powerful fan to be used to generate a significantly higher airflow which allows greater thermal transfer of heat generated by a heat source, e.g.—a processor, disposed within a portable electronic device, e.g.—a notebook computer. Furthermore, connector space is not compromised on the portable electronic device. Still furthermore, the use of a larger more powerful external fan allows the second heat exchanger to be relatively small, thereby minimizing the space requirements in the portable electronic device.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations of modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A discrete fan booster module attachable to an external surface of a portable electronic device at a location on the portable electronic device opposing a fan-coolable secondary air heat-exchanger unit that is discrete from a fan-cooled primary air heat-exchanger internal to the portable electronic device, the fan booster module including a fan to boost cooling air flow through the secondary air heat-exchanger unit of the portable electronic device.

2. A discrete fan booster module as claimed in claim 1, wherein the secondary air heat-exchange unit is thermally coupled to receive heat from a heat source of the portable electronic device.

3. A discrete fan booster module as claimed in claim 2, wherein the fan booster module is attachable at a location defined by a retractable cover forming part of the external surface of the portable electronic device.

4. A discrete fan booster module as claimed in claim 1, wherein the fan booster module is attachable to the external surface by at least one of a mechanical snap-on or click-on mechanism.

5. A discrete fan booster module as claimed in claim 1, comprising a seal to form a substantially air-tight seal between the discrete fan booster module and the portable electronic device.

6. A discrete fan booster module as claimed in claim 1, wherein the portable electronic device is a portable computer.

7. A discrete fan booster module means for attaching to an external surface of a portable electronic device at a location on the portable electronic device opposing a fan-coolable secondary air heat-exchange means that is discrete from a fan-cooled primary heat-exchanger internal to the portable electronic device, the fan booster module means including a fan means for boosting cooling air flow through the secondary air heat-exchange means of the portable electronic device.

8. A discrete fan booster module means as claimed in claim 7, wherein the secondary air heat-exchanger means is thermally coupled to receive heat from a heat source of the portable electronic device.

9. A discrete fan booster module means as claimed in claim 8, wherein the fan booster module means is attachable at a location defined by a retractable cover forming part of the external surface of the portable electronic device.

10. A discrete fan booster module means as claimed in claim 7, wherein the fan booster module means is attachable to the external surface by at least one of a mechanical snap-on or click-on mechanism.

11. A discrete fan booster module means as claimed in claim 7, comprising a seal to form a substantially air-tight seal between the discrete fan booster module means and the portable electronic device.

12. A discrete fan booster module as claimed in claim 7, wherein the portable electronic device is a portable computer.

13. A portable electronic device comprising:
a housing;
a discrete fan booster module attached to an external surface of the housing of the portable electronic device at a location on the portable electronic device opposing a fan-coolable secondary air heat-exchanger unit that is discrete from a fan-cooled primary air heat-exchanger internal to the portable electronic device, the fan booster module including a fan to boost cooling air flow through the secondary air heat-exchanger unit of the portable electronic device.

14. A portable electronic device as claimed in claim 13, wherein the secondary air heat-exchanger unit is thermally coupled to receive heat from a heat source of the portable electronic device.

15. A portable electronic device as claimed in claim 13, wherein the fan booster module is attached at a location defined by a retractable cover forming part of the external surface of the housing of the portable electronic device, and wherein the retractable cover is closeable to cover the at least one heat exchanger when the fan booster module is not attached.

16. A portable electronic device as claimed in claim 13, wherein the fan booster module is attached to the external surface by at least one of a mechanical snap-on or click-on mechanism.

17. A portable electronic device as claimed in claim 13, comprising a seal to form a substantially air-tight seal between the discrete fan booster module and the portable electronic device.

18. A portable electronic device as claimed in claim 13, wherein portable electronic device is a portable computer.

* * * * *